United States Patent [19]

Nakata et al.

[11] 4,042,774

[45] Aug. 16, 1977

[54] PARTICLE TRAPPING SHEATH COUPLING FOR ENCLOSED ELECTRIC BUS APPARATUS

[75] Inventors: Roy Nakata, Pittsfield, Mass.; William Joseph Johenning, Wallingford, Pa.

[73] Assignee: General Electric Company, Philadelphia, Pa.

[21] Appl. No.: 675,009

[22] Filed: Apr. 8, 1976

[51] Int. Cl.² .............................................. H01B 9/04
[52] U.S. Cl. ............................... 174/14 R; 174/16 B; 174/21 C; 174/28
[58] Field of Search ..................... 174/14 R, 16 B, 28, 174/29, 21 R, 21 C, 21 CA

[56] References Cited

U.S. PATENT DOCUMENTS

| | | | |
|---|---|---|---|
| 3,639,671 | 2/1972 | Clark | 174/28 X |
| 3,767,837 | 10/1973 | Graybill | 174/28 X |
| 3,777,045 | 12/1973 | Artbauer | 174/28 |
| 3,789,214 | 1/1974 | Goldie et al. | 174/28 X |
| 3,792,188 | 2/1974 | Cronin | 174/28 |
| 3,813,475 | 5/1974 | Cronin | 174/28 X |
| 3,814,879 | 6/1974 | Cookson et al. | 174/28 UX |
| 3,856,978 | 12/1974 | Sletten et al. | 174/28 X |
| 3,864,507 | 2/1975 | Fox et al. | 174/28 X |
| 3,895,176 | 7/1975 | Cookson et al. | 174/16 B |
| 3,898,367 | 8/1975 | Nakata | 174/28 X |

OTHER PUBLICATIONS

Bortnik, J. M; Cooke, C. M. *Electrical Breakdown and the Similarity in $SF_6$ at Extra High Voltages*, IEEE Winter Meeting Power Engineering Society, Jan./Feb. 1972.

Diessner, A.; Trump J. C. *Free Conducting Particles in a Coaxial Compressed-Gas-Insulated System*, IEEE Transactions on PAS. vol. PAS-89 No. 8 Nov./Dec. 1970 pp. 1970-1978.

*Primary Examiner*—Arthur T. Grimley
*Attorney, Agent, or Firm*—William Freedman

[57] ABSTRACT

A sectionalized horizontal enclosing sheath for high voltage, gas-insulated electric bus apparatus comprises axially adjacent sheath members in spaced-apart relation connected by an annular coupling band. Juxtaposed ends of the band cooperate with the spaced apart sheath members to define an elongated transverse aperture in a bottom wall of the sheath and between the coupled sheath members. A box-like receptacle for trapping free conducting particles within the sheath is affixed over the aperture externally of the sheath.

6 Claims, 6 Drawing Figures

PARTICLE TRAPPING SHEATH COUPLING FOR ENCLOSED ELECTRIC BUS APPARATUS

Our invention relates to high voltage electric bus apparatus comprising a bus conductor enclosed in coaxial radially spaced relation within a sectionalized and grounded tubular metal sheath, and particularly to such apparatus wherein the sheath is disposed with its longitudinal axis horizontal and filled with insulating gas under pressure. The invention is especially applicable to sectionalized bus apparatus utilized for conduction of direct current at very high voltages, as very high voltages as over 50,000 volts.

Electric bus apparatus of the character described, when filled with insulating gas such as sulphurhexafluoride at high pressure, has extremely high dielectric strength and is suitable for both alternating and direct current use at voltages well over 50,000 volts, as for example the range of 200,000 to 800,000 volts. At such voltage small loose solid particles, and particularly free conducting particles such as metal chips and shavings, which remain in the sheath even after careful mechanical cleaning prior to assembly, impair dielectric strength in a variety of ways. At such high voltage levels, especially in direct current applications, such particles may migrate between the grounded sheath and the enclosed high voltage conductor, or may remain in a levitated or partially levitated state adjacent the conductor surfaces. Under such conditions free conducting particles randomly in motion in the insulating gas space between electrodes may cause corona, sparks "fire flies" and field distortion which severely reduce dielectric strength in the insulating gas space. In addition, such addition, such particles tend to adhere by electrostatic action to the surface of supporting insulators within the sheath and thereby to facilitate creepage and breakdown along the insulator surfaces. Theories underlying these actions are explained at greater length in a paper by Cronin et al entitled "Optimization of Insulators for Gas Insulated System," IEEE Transactions, Power Apparatus and Systems, Vol. PAS 2, Mar./Apr. 1973, pages 558–564, in a paper by Trump and Diessner, entitled "Free Conducting Particles in a Coaxial Compressed Gas Insulated System," IEEE Transactions, Power Apparatus and Systems, Vol. PAS 89, No. 8 Nov./Dec. 1970, pages 1970–1978, and in U.S. Pat. No. 3,814,879-Cookson et al.

It will be apparent from the foregoing patent and technical articles that various structures have been proposed for trapping free conducting particles in enclosed, gas-filled electric bus apparatus. One such structure, shown in U.S. Pat. No. 3,792,188-Cronin, comprises a longitudinally corrugated enclosure providing regions of somewhat reduced electric field strength at the bottom of each relatively shallow corrugation. Cronin also discloses that initial clean-up of particles may be accomplished by the application of a high unidirectional voltage substantially lower than a high rated alternating voltage.

We have discovered that when a unidirectional voltage supplied between the electrodes of an enclosed gas insulated electric bus apparatus is sufficiently high to levitate, or lift off from the electrode surfaces, any free conducting particles in the enclosure the particles will migrate back and forth between the electrodes, reversing their charge on each contact with an electrode. It can be demonstrated that with unidirectional voltage the lift-off, or levitation, voltage is substantially the same as transit voltage. It is very difficult to trap particles continuously migrating in this manner between electrodes. It is also known that when alternating current is applied such electrodes free conducting particles in the interelectrode space will be partially or barely levitated at a first high voltage level, but not perform a full transit to the other electrode until a substantially higher voltage is applied. In the barely or partially levitated state particles are typically lifted from the surface and return toward or into reengagement with the surface repeatedly and in random manner as they dance or oscillate in a narrow region immediately adjacent the electrode surface. In a copending patent application Ser. No. 636,254 filed by Roy Nakata on Nov. 28, 1957 and assigned to the same assignee as the instant application there is described an claimed an electric bus structure and particle trapping method which utilizes these characteristics to efficiently clear and enclosed electric bus apparatus of free conducting particles.

In sectionalized enclosed bus apparatus of the character described it is desirable to form deep trench-like particle traps in the bottom wall of the enclosing sheath at the junctures of metallic sheath components. This is particularly the case where one or both of the sheath sections or other components to be joined is of a configuration designed to provide an inclined bottom surface leading to a particle trap.

It is therefore a principal object of our invention to provide combined coupling and particle trapping means for electric bus enclosing sheaths.

It is a more particular object of our invention to provide improved coupling means for sectionalized electric bus enclosing sheaths which permits substantial tolerance in dimensional accuracy of the components to be joined while cooperating with the joined components to provide a particle trapping aperture in the sheath.

It is still another object of our invention to provide improved coupling means for sectionalized electric bus enclosing sheaths which minimizes the generation of metal shavings in the coupling operation while cooperating with the joined components to provide an effective electrostatic particle trap in the sheath.

In carrying out our invention in one preferred embodiment we connect axially adjacent sections or sectional components of tubular metallic bus sheath by means of a band encircling axially-apart ends of the tubular members. Preferably at least one of the sheath components is slightly flared axially toward the coupled ends. The band is split transversely (i.e., parallel to the sheath axis) and is formed at its peripherally juxtaposed ends to define an elongate transverse particle trapping aperture in a botom wall of the sheath. To retain particles passing through such aperture a radially deep trapping receptacle is mounted externally upon the sheath over the aperture. Desirably the ends of the coupling band are closely juxtaposed and at least one end is slotted to define the sheath aperture in both width and length. Preferably also the juxataposed ends are in tongue and slot relationship to align the band ends in assembly. Welding is preferably utilized to connect the coupling band to the tubular sheath components and to connect the trapping receptacle to the sheath. The trapping receptacle may have a mouth or opening either larger or smaller in cross section than the sheath aperture.

Our invention will be more fully understood and its advantages further appreciated by referring now to the following detailed description taken in conjunction with the accompanying drawing wherein.

Figure 1:
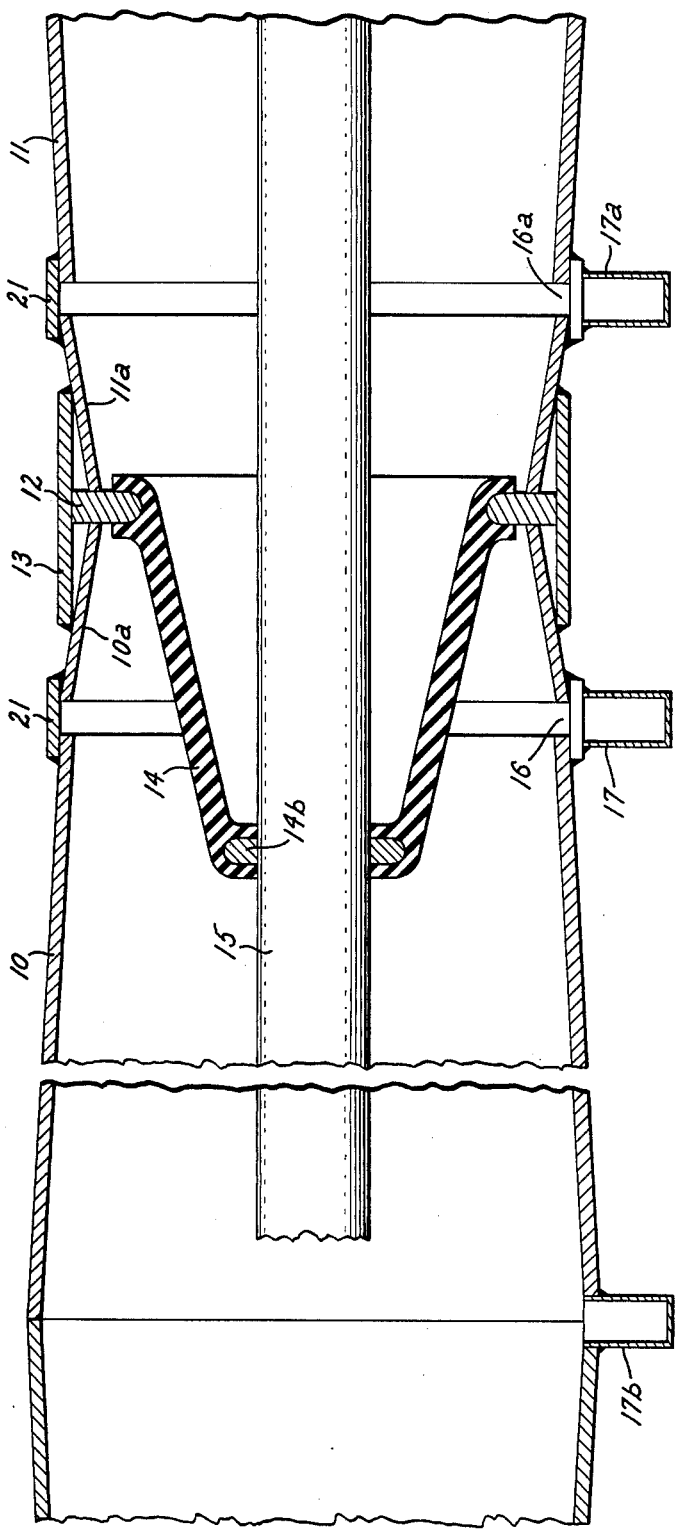
FIG. 1 is a fragmentary axial cross sectional view of enclosed electric bus apparatus including a coupling band and particle trap embodying our invention.
Figure 2:
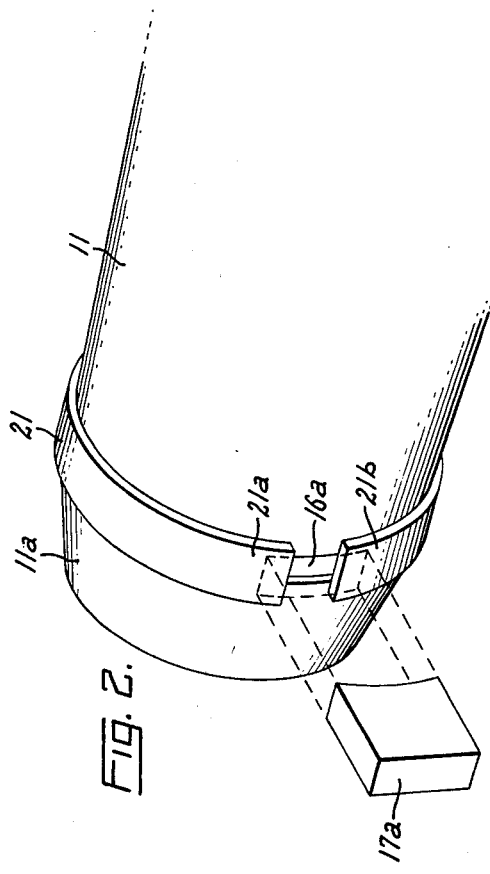
FIG. 2 is a partially exploded perspective view of one juxtaposed pair of bus sheath components including a combined particle trap and sheath coupling as shown at FIG. 1.
Figure 3:
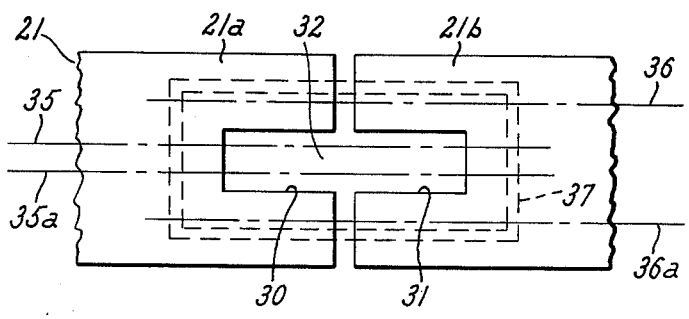
Figure 3A:
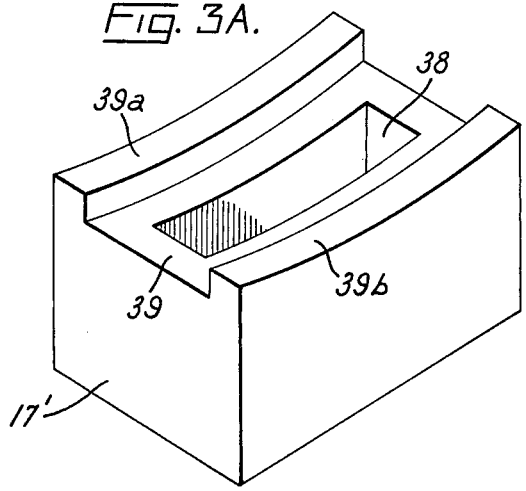

FIG. 3 is a fragmentary plan view of a modified form of coupling band embodying our invention, showing in broken lines its relation to the coupled sheath components and to an associated particle trapping receptacle, FIG. 3A is a perspective view of a modified trapping receptacle especially adapted for use with the coupling bands of FIGS. 1-3, and FIGS. 4 and 5 are fragmentary plan views similar to that of FIG. 3 illustrating the juxtaposed ends of coupling bands which embody still further modifications of our invention, the broken line relationships of FIG. 3 being omitted for the sake of simplification.

Referring now to the drawing, we have illustrated at FIG. 1 a fragmentary length of enclosed electric bus apparatus which comprises a high voltage conductor 15 coaxially positioned with a sectionalized tubular metal sheath. The enclosing sheath is formed of a plurality of sections 10, 11 axially connected together in end-to-end relation with an insulator mounting ring 12 therebetween. The sheath sections 10, 11 each include outwardly tapered (i.e., inwardly flared) conical end collars 10a, 11a respectively, each connected by a welded coupling band 21 to the main body of the sheath section.

It will, of course, be understood that while the drawing illustrates only a single pair of axially adjacent sheath sections for the purpose of illustration, the sheath may comprise any desired number of tubular sections 10, 11, etc. with insulator support rings 12 and insulators 14 mounted at spaced points along the sheath intermediate each adjacent pair of sheath sections. In the illustrated embodiment the tubular sheath is cylindrical in cross section but other tubular configurations may be used if desired.

Each cooperating pair of adjacent end collars 10a, 11a is connected together by an annular connecting band 13 welded to each collar, the mounting ring 12 between the collars being backed up and supported radially by the band 13. Annular insulators 14 mounted within each mounting ring 12 carry the central high voltage conductor 15. If desired the oppositely flared conical collars 10a, 11a, the connecting band 13, the mounting insulator 14 may be connected together as a subassembly for final connection to the main body portions of adjacent sheath sections by the welded coupling bands 21.

The end collars 10a, 11a, need be only slightly conical (i.e., preferably at an angle of the order of 3° to 5° with respect to the central axis). While the conical angle may be greater if desired space considerations usually require an angle less than about 20°. The adjacent collars 10a, 11a are in axial juxtaposition with their ends of minimum cross section (i.e., minimum diameter in a cylindrical sheath) adjacent the mounting ring 12 and their ends of maximum cross section axially remote. The inner surfaces of a juxtaposed pair of collars 10a, 11a thus flare outwardly in opposite directions from the intermediate mounting ring 12, so that with the axis of the bus horizontal the bottom surfaces of the collars 10a, 11a are inclined or ramped, downwardly in opposite directions along the axis of the bus and away from the mounting ring 12. Along this bottom portion of the enclosing sheath, and immediately adjacent the lowest points of the opposed collars 10a, 11a, the sheath sections 10, 11 are apertured at the junctions between the main body of each sheath section and the respective end collar 10a, 11a. Such apertures, as at 16, 16a, are formed by the coupling bands 21 in cooperation with the juxtaposed axially spaced ends of the coupled sheath members (i.e., in the case illustrated the body portion and end collar of each sheath section). The apertures 16, 16a are covered externally by small box-like receptacles 17, 17a forming particle traps in the bottom surface of the bus sheath at the lowest point of each ramped end collar 10a, 11a.

As shown at FIG. 2 the particles trap receptacles 17, 17a extend over a small arcuate bottom portion of the tubular sheath, subtending for example an arc of the order of 10° to 60° in a sheath of circular cross section. Desirably the receptacles 17, 17a are long in arcuate span and deep in radial depth relative to their axial width, thereby to form trench-like traps having a length and depth of the order of at least several times their axial width. The axial width of each trap 17, 17a should be small also in terms of the radial insulating gap between the sheath 10, 11 and the central conductor 15, preferably being of the order of 1/10 or less the length of the insulating gap. By this deep trench configuration electrical flux lines of equipotential above sheath potential make only relatively shallow excursions into the open mouth of each trap.

It is desirable also to incline downwardly in an axial direction the bottom of the main body portions of each sheath between the tapered collars affixed to its ends. At FIG. 1 we have illustrated such inclination as resulting from the formation of the main body portion of each sheath section 10, 11 in opposed conical configuration with a region of maximum cross section intermediate its ends. An arcuate trench type particle trap 17b, similar in dimension to the traps 17, 17a, is formed in the bottom surface of the sheath section at the lowest point of the converging bottom surfaces.

The particle trapping bus structure generally described above is described with greater particularly and is claimed in certain aspects in the foregoing application Ser. No. 636,254. Our present invention is directed to the combined coupling and particle trapping structure constituted by the coupling bands 21 and associated trapping receptacles 17, 17a, as further illustrated in FIGS. 2 to 6 of this application.

At FIG. 2 we have shown in fragmenting and partially exploded perspective view the single tubular sheath section 11 including its end collar 11a and the split coupling band 21, all disposed in cooperative relation with the particle trapping receptacle 17a. For such connection the juxtaposed ends of the sheath members coupled by band 21 are of substantially identical cross sectional size and configuration and are axially spaced apart a distance less than the width of the band 21. The particle trapping receptacle 17a may have an entrance opening or mouth greater than, smaller than or equal to the axial spacing of the sheath members. In high voltage bus wherein the radial distance between the central conductors 15 and internal sheath surface is of the order of 4 to 12 inches I find that a suitable axial width for the receptacle entrance slot or aperture is of the order of 1/4 ot 3/4 inch.

In the embodiment of our invention illustrated at FIG. 2 the length of the particle trapping slot formed between axially juxtaposed ends of the sheath 11 and its collar 11a is determined by the juxtaposed but peripherally spaced apart ends 21a, 21b of the split coupling band 21. As illustrated at FIG. 2, the ends of the coupling band 21 do not meet but fall short of meeting by a radial angle preferably of the order of 5° to 5°, thereby defining the length of a transverse arcuate particle trapping slot 16a extending across the bottom wall surface of the tubular sheath 11. In a sheath in the range of sizes referred to above this length may be of the order of 3 to 10 inches. If desired, of course, the arcuate length of the receptacle mouth may be less than the peripheral spacing of the band ends 21a, 21b. To complete the assembly the coupling band 21 is welded around one peripheral edge to the body portion of sheath 11 and around its opposite peripheral edge to the tapered end collar 11a. The particle trapping receptacle 17a is welded in position externally of the sheath and over-lying the sheath aperture 16a.

It may now be observed that by utilizing a banded connection such as described herein between spaced apart components of a sectionalized enclosing sheath we accomplish simultaneously the connection of the sheath members and the formation of a particle trapping therebetween. By such connection we also avoid any need for extreme accuracy in machining or otherwise forming the ends of the coupled sheath members, as would be required if the ends were brought into mating engagement. Moreover, by utilizing a clamped connection which permits the juxtaposed ends of coupled sheath members 11, 11a to be apart for connection we minimize the generation of metal shavings, chips or other particles in the coupling operation and the consequent deposition of such particles within the sheath.

It will be understood by those skilled in the art that during the welding operation the coupling band 21 must be securely tightened circumferentially around the juxtaposed sheath members by any suitable clamping means. In order to avoid deposition within the sheath particles unavoidably formed by the welding operation we prefer to utilize during welding an annular heat resistant gasket (not shown) positioned between the coupling band 21 and each of the juxtaposed sheath members.

In the structure shown at FIG. 2 apertures exist also beneath the sides of receptacle 17b and between the band ends 21a, 21b. While it is possible to pack these apertures to exclude weld products from the interior of the sheath it is preferable to minimize or eliminate these apertures.

Referring now to FIG. 3 we have shown an embodiment of my invention wherein the juxtaposed ends 21a, 21b of the split coupling band 21 are in closely spaced abutting relation but provided with mating slots 30, 31, the mating slots together defining a slotted opening 32 in the band 21. The slot 32 overlies the axial space between the coupled components of sheath section 11, 11a. As desired the slot 32 may be wider than the minimum desired spacing between the juxtaposed ends of the sheath members or it may be narrower than that spacing so that the slot 32 in itself defines the width of the sheath aperture. At FIG. 3 we have shown by broken lines 35, 35a a minimum spacing between adjacent sheath members; by broken lines 36, 36a we have shown a maximum spacing between such sheath member.

At FIG. 3 the location for receptacle 17b as shown at FIG. 2 is outlined by the broken lines 37. In such location the side walls of the receptacle lie against the outer surface of band 21 and thus span the gap between the band ends 21a, 21b. While that gap is small in the embodiment shown at FIG. 3 it still may permit some products to enter the sheath.

At FIG. 3A we have illustrated a trapping receptacle 17′ of a modified form adapted especially for use with coupling bands of the types shown at FIGS. 2 and 3. The receptacle 17′ of FIG. 3A is shown formed from a solid block of metal, as by milling. It is provided with an inner recess 38 having an entrance opening at an arcuate surface 39 adapted to overlie the ends of band 21 in flatwise engagement. At its lateral arcuate edges the receptacle 17′ is formed with langes 39a, 39b which extend over the side edges of band 21 and into engagement with the sheath members 11, 11a. The flanges 39a, 39b thus close any lateral gap between the ends 21a, 21b of band 21.

Figure 4:
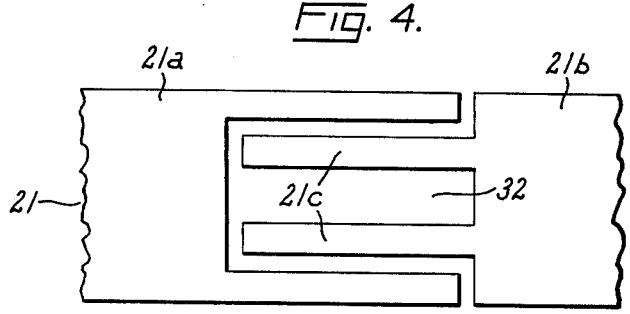

Referring now to FIG. 4, we have illustrated an embodiment of our invention wherein the peripherally juxtaposed ends 21a, 21b of the coupling band 21 are overlapping in mating tongue and slot relationship in order to align the ends of the bands in assembly. A slotted opening 32 is provided in the band by centrally slotting a tongue 21c on the mating end 21b. By this tongue and slot arrangement the tongue blocks direct lateral access to the sheath interior unless the spacing of sheath members 11, 11a is very wide. It will be appreciated therefore that the overlaping receptacle 17′ of FIG. 3A may desirably be used with any of the several forms of coupling band 21 illustrated in the drawing.

Figure 5:
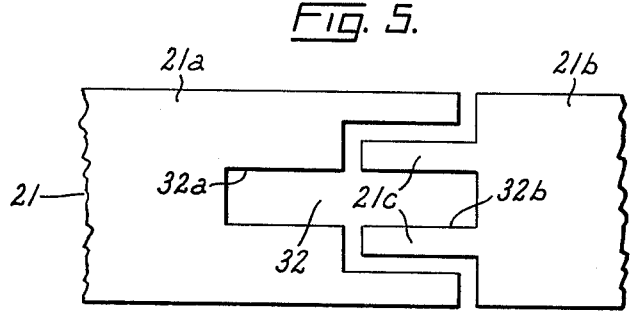

At FIG. 5 we have shown a further embodiment of our invention similar to that shown at FIG. 4 but wherein the slot 32 is defined by aligned slots 32a, 32b in the band ends 21a and the tongue 21c, respectively.

While we have described by way of illustration only certain preferred embodiments of our invention, many modifications will occur to those skilled in the art, and we therefore intend in the appended claims to cover all such modifications as fall within the true spirit and scope of our invention.

What I claim as new and desire to secure by Letters Patent of the United States is:

1. High voltage electric bus apparatus adapted for disposition with its longitudinal axis substantially horizontal and including a high voltage conductor disposed in coaxial radially spaced relation within a sectionalized tubular metallic enclosing sheath comprises, a pair of tubular sheath members disposed in axially spaced apart end-to-end relation, a coupling band enveloping axially juxtaposed ends to said sheath members and having an axial width greater than the space between said ends, said band being split axially along said sheath and peripherally juxtaposed ends of said band defining an elongate transverse particle trapping aperture in a bottom wall of said sheath between said coupled sheath members, and a particle trapping receptacle fixedly mounted over said aperture externally of said sheath.

2. High voltage electric bus apparatus according to claim 1 wherein at least one said sheath member is axially flared toward said coupling band thereby to provide a bottom surface inclined toward said aperture.

3. High voltage electric bus apparatus according to claim 1 wherein juxtaposed ends of said split coupling band are peripherally spaced apart at the bottom of said sheath sufficiently to define therebetween the ends of said elongate transverse particle trapping aperture.

4. High voltage electric bus apparatus according to claim 3 wherein side walls of said receptacle overlap the side edges of said coupling band.

5. High voltage electric bus apparatus according to claim 1 wherein juxtaposed ends of said split coupling band are disposed in proximate mating relation at the bottom of said sheath and at least one said band end is slotted to define said transverse aperture between sheath members.

6. A high voltage electric bus apparatus according to claim 1 wherein juxtaposed ends of said split coupling band interfit in tongue and slot relation at the bottom of said sheath and at least one said band end is slotted to define said transverse trapping aperture space between said sheath members.

* * * * *